(12) United States Patent
Sestok et al.

(10) Patent No.: US 8,750,816 B2
(45) Date of Patent: Jun. 10, 2014

(54) METHOD TO DETERMINE RF CIRCUIT ANTENNA IMPEDANCE

(75) Inventors: Charles Sestok, Dallas, TX (US); Kun Shi, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 199 days.

(21) Appl. No.: 13/569,921

(22) Filed: Aug. 8, 2012

(65) Prior Publication Data

US 2013/0040593 A1 Feb. 14, 2013

Related U.S. Application Data

(60) Provisional application No. 61/521,465, filed on Aug. 9, 2011.

(51) Int. Cl.
*H04B 17/00* (2006.01)

(52) U.S. Cl.
USPC .................. 455/226.4; 455/125; 455/129

(58) Field of Classification Search
USPC ...................... 455/67.1, 226.4, 125
See application file for complete search history.

(56) References Cited

U.S. PATENT DOCUMENTS

| | | | | |
|---|---|---|---|---|
| 4,791,351 A | * | 12/1988 | Le Traon et al. | 324/646 |
| 6,961,368 B2 | * | 11/2005 | Dent et al. | 375/219 |
| 7,239,858 B2 | * | 7/2007 | Bellantoni | 455/277.1 |
| 7,865,154 B2 | * | 1/2011 | Mendolia et al. | 455/125 |
| 8,693,963 B2 | * | 4/2014 | du Toit et al. | 455/125 |
| 2012/0041699 A1 | | 2/2012 | Sestok | |

* cited by examiner

*Primary Examiner* — Temesgh Ghebretinsae
*Assistant Examiner* — Richard Chan
(74) *Attorney, Agent, or Firm* — Warren L. Franz; Wade J. Brady, III; Frederick J. Telecky, Jr.

(57) ABSTRACT

A process of estimating an admittance of an RF component using a ladder network with alternating series and parallel components by making three VSWR measurements and computing three admittance circle solutions in the complex admittance plane. The admittances circles are transformed through reference planes of the ladder network to obtain three RF component admittance circles, then estimating the RF component admittance using three nearest intersections of the three RF component admittance circles. Reference planes are defined immediately upstream and immediately downstream of each component of the ladder network. The transforms are performed using lumped parameter models of the series and parallel components of the ladder network.

20 Claims, 11 Drawing Sheets

METHOD TO DETERMINE RF CIRCUIT ANTENNA IMPEDANCE

This application claims the benefit of Provisional Application No. 61/521,465, filed Aug. 9, 2011, the entirety of which is hereby incorporated by reference.

BACKGROUND

This invention relates to the field of RF circuits. More particularly, this invention relates to matching networks in RF circuits.

An antenna of a radio frequency (RF) circuit may have varying admittance values, depending on the electrical environment around the antenna. Admittance has a complex numerical value consisting of a real conductance and an imaginary susceptance. For example, an antenna in a cellular phone may have one value of admittance when the cellular phone is held close to a human body and a different admittance value whantenna and another component, such as a transmission line, of the RF circuit coupled to the antenna. The matching network may reduce power losses due to reflected waves caused by an admittance mismatch between the antenna and the component coupled to the antenna. An approach to tuning the matching network so as to reduce admittance mismatch as the antenna admittance varies is disclosed in Provisional Application No. 61/373,273, filed Aug. 12, 2010, the entirety of which is incorporated herein by reference. This application relates to measuring the admittance of an RF frequency component at various instances in time.

SUMMARY

A method for estimating an admittance of an RF component is disclosed.

In described example embodiments, admittance of an RF component such as an antenna may be estimated by measuring the voltage standing wave ratio (VSWR) of the antenna in series with a ladder network of characterized components for three or more different configurations of the ladder network components. Admittance solutions to the VSWR equation, which are characterized as circles in the admittance plane, are propagated by reference planes through the ladder network to the antenna. Intersections of three solutions to the three VSWR measurements enable an estimation of the antenna admittance.

DETAILED DESCRIPTION OF EXAMPLE EMBODIMENTS

Admittance values, represented by the variable y, are complex numbers. The real part of the admittance y is referred to as the conductance, represented by the variable g, and the imaginary part of the admittance y is referred to as the susceptance, represented by the variable b. This relationship may be expressed as $$y = g + jb, \quad (1)$$

where $j = \sqrt{-1}$.

Similarly, impedance values, represented by the variable z, are complex numbers. The real part of the impedance z is referred to as the resistance, represented by the variable r, and the imaginary part of the impedance z is referred to as the reactance, represented by the variable x. This relationship may be expressed as $$z = r + jx. \quad (2)$$

Admittance of an RF component such as an antenna may be estimated by measuring a voltage standing wave ratio (VSWR) of the RF component in series with a ladder network of characterized components for at least three different configurations of the ladder network components. Admittance solutions to the VSWR equation, which are circles in an admittance plane, are propagated by reference planes through the ladder network to the antenna. Intersections of three solutions to the three VSWR measurements enable an estimation of the antenna admittance.

Figure 1:
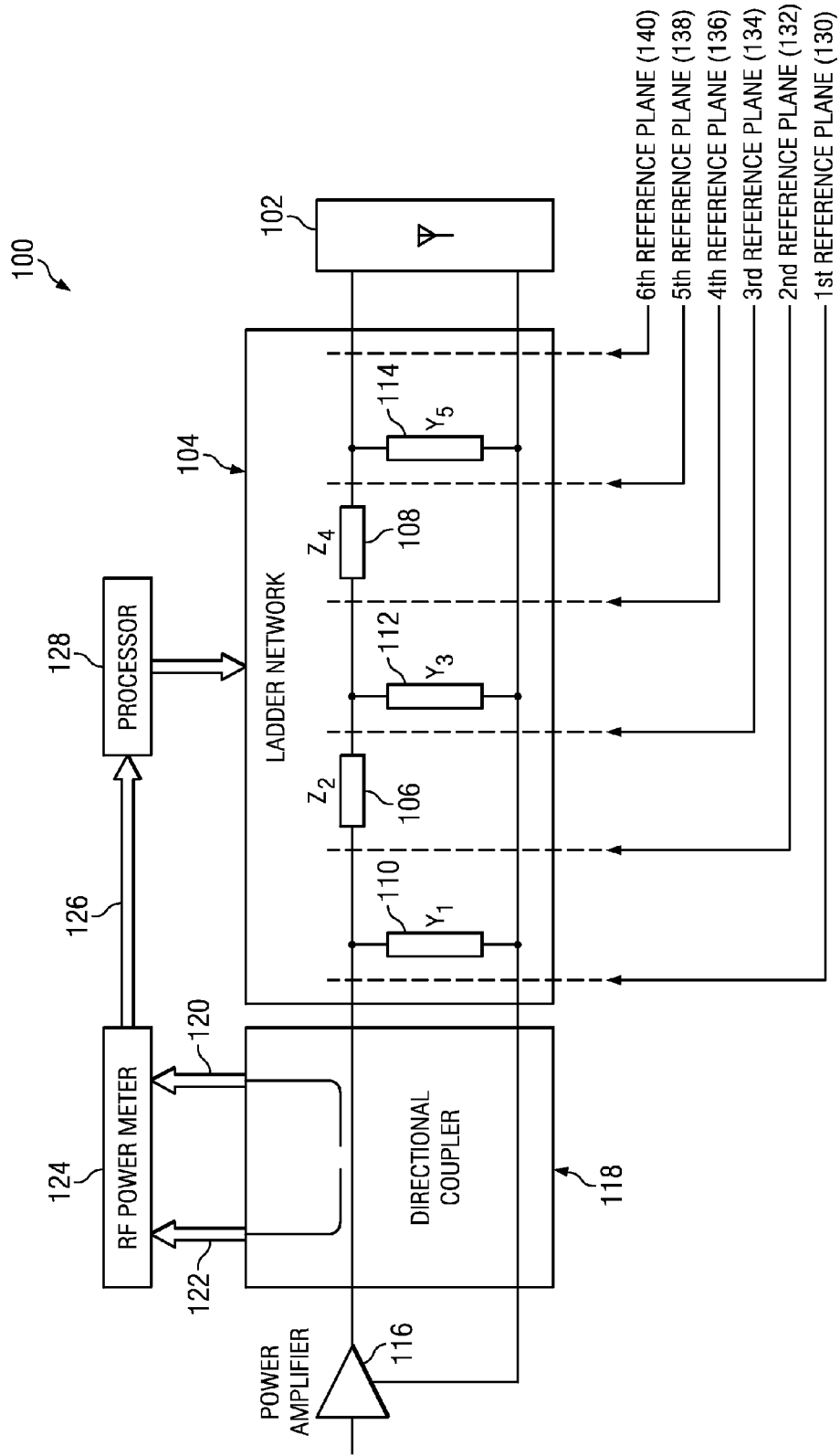
FIG. 1 depicts an RF circuit, containing an antenna and a ladder network for estimating an admittance of the antenna according to an embodiment.

FIG. 1 depicts an example RF circuit, containing an antenna and a ladder network, for estimating an admittance of the antenna according to an embodiment. The RF circuit 100 includes the antenna 102 connected in series with the ladder network 104. The ladder network 104 has alternating series components, in the instant embodiment $Z_2$ 106 and $Z_4$ 108, and parallel components, in the instant embodiment, $Y_1$ 110, $Y_3$ 112 and $Y_5$ 114. At least one of the series components $Z_2$ 106 and $Z_4$ 108, and parallel components $Y_1$ 110, $Y_3$ 112 and $Y_5$ 114 is configurable to a plurality of admittance values. In the instant embodiment, the parallel components $Y_1$ 110, $Y_3$ 112 and $Y_5$ 114 may each have a plurality of capacitors in parallel which may be adjusted in value.

The ladder network 104 of the instant embodiment has a pi topology in which the first component $Y_1$ 110, and last component $Y_5$ 114, are parallel components. Other embodiments may have ladder networks with tee topologies in which the first and last components are series components. Still other embodiments may have mixed topologies, in which the first component is a parallel component and the last component is a series component, or vice versa. The ladder network 104 of the instant embodiment has five components. Ladder networks in other embodiments may have any number of alternating series and parallel components.

The RF circuit 100 further includes a signal source such as an RF power amplifier 116 coupled to the ladder network 104 through a directional coupler 118. The directional coupler 118 provides an incident signal 120 and a reflected signal 122 to an RF power meter 124. The RF power meter 124 may include, for example, a logarithmic amplifier or a bolometer RF power detector. The incident signal 120 is related to an incident signal from the signal source 116 into the ladder network 104. The reflected signal 122 is related to a reflected signal from the ladder network 104. The RF power meter 124 provides a power meter output signal 126 to a processor 128. In one version of the instant embodiment, the RF power meter 124 may include a logarithmic amplifier and the power meter output signal 126 may include an analog signal proportional to a logarithm of the incident signal 120 and another analog signal proportional to a logarithm of the reflected signal 122. The processor 128 is operable to receive the power meter output signal 126 and compute a reflection coefficient value and a VSWR value. The processor 128 is further configured to adjust admittance values of the configurable components in the ladder network 104. In the instant embodiment, the configurable components are the parallel components $Y_1$ 110, $Y_3$ 112 and $Y_5$ 114.

A series of reference planes may be defined through the ladder network 104. A first reference plane 130 is defined immediately upstream of the first component in the ladder network 104. In the instant embodiment, the first reference plane 130 is defined immediately upstream of the parallel component $Y_1$ 110. A second reference plane 132 is defined immediately downstream of the first component and immediately upstream of the second component in the ladder network 104. In the instant embodiment the second reference plane 132 is defined immediately downstream of parallel component $Y_1$ 110 and immediately upstream of series component $Z_2$ 106. Additional sequential reference planes are defined between each adjacent pair of series component and parallel component of the ladder network 104. For the example depicted in FIG. 1, a third reference plane 134 is defined immediately downstream of series component $Z_2$ 106 and immediately upstream of parallel component $Y_3$ 112; a fourth reference plane 136 is defined immediately downstream of parallel component $Y_3$ 112 and immediately upstream of series component $Z_4$ 108; and a fifth reference place 138 is defined immediately downstream of series component $Z_4$ 108 and immediately upstream of parallel component $Y_5$ 114. A last reference plane is defined immediately downstream of the last component of the ladder network and immediately upstream of the antenna 102. In the depicted embodiment, the last reference plane is sixth reference plane 140 defined immediately downstream of parallel component $Y_5$ 114 and immediately upstream of the antenna 102. The number of reference planes so defined is the number of components in the ladder network 104 plus one. The directions downstream and upstream refer to signal flow from the power amplifier 116 to the antenna 102. Downstream is in the same direction as the signal flow, and upstream is the opposite direction as the signal flow.

Figure 2:
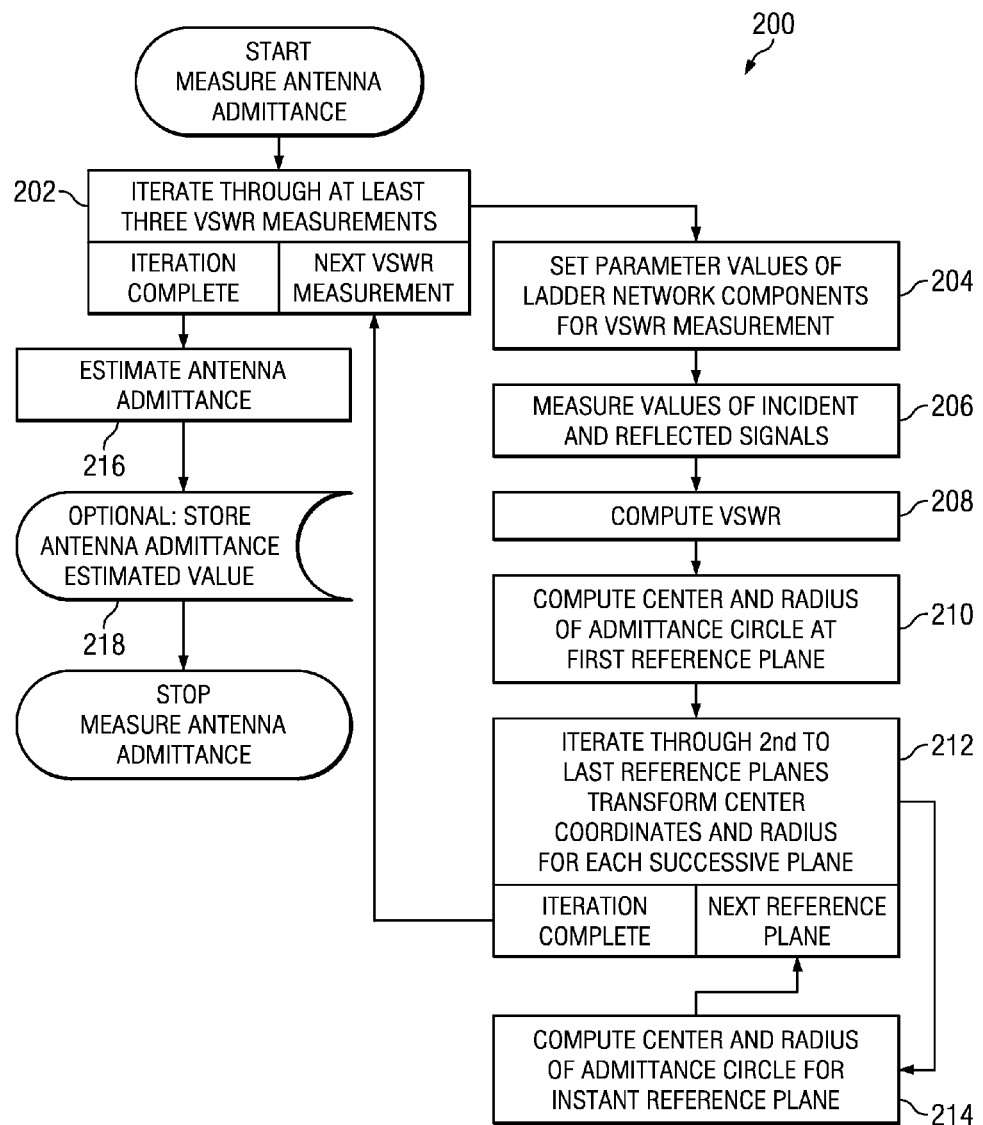
FIG. 2 is a flowchart of an example process for estimating the admittance of the antenna using the RF circuit of FIG. 1.

FIG. 2 is a flowchart of an example process for estimating the admittance of the antenna 102 using the RF circuit 100 of FIG. 1. The process 200 begins with step 202 with iteration through at least three VSWR measurements. For each iteration, steps 204 through steps 214 are performed.

The first step in the iteration of VSWR measurements is step 204 which sets parameter values of ladder network components for the VSWR measurement. The processor 128 adjusts the admittance values of the configurable components in the ladder network 104 to desired values for the VSWR measurement.

Next, step 206 measures first values of incident and reflected signals. The RF power amplifier 116 provides a signal at a desired frequency. The directional coupler 118 provides a value of the incident signal 120 into the ladder network 104 and a value of the reflected signal 122 from the ladder network 104 to the RF power meter 124.

Next, in step 208, the processor 128 computes a magnitude of a ratio of the value of the reflected signal 122 to the value of the incident signal 120 to provide a reflection coefficient magnitude value $|\Gamma|$. The processor 128 then computes a VSWR value using the following equation:

$$VSWR = \frac{1 + |\Gamma|}{1 - |\Gamma|}. \tag{3}$$

Next, in step 210, a center and a radius of an admittance circle in the complex admittance plane are computed for the first reference plane 130. The admittance circle includes possible values of admittance which would produce the first VSWR value, $VSWR_1$. The coordinates of the center of the admittance circle in the complex admittance plane are computed using the following equations:

$$g_c = -\frac{VSWR^2 + 1}{2 \times VSWR}; \tag{4}$$

and $$b_c = 0; \tag{5}$$

where $g_c$ is the real coordinate of the complex admittance plane, and $b_c$ is the imaginary coordinate of the complex admittance plane.

The radius $R_c$ of the admittance circle in the complex admittance plane is computed using the following equation:

$$R = -\frac{VSWR^2 + 1}{2 \times VSWR}. \tag{6}$$

Next, step 212 is to iterate through the second to the last reference planes and transform the coordinates of the center and the radius of the admittance circle in the complex admittance plane for each successive reference plane. Instances of step 212 in which the successive reference plane is immediately downstream of a parallel component with admittance given by $y_p = g_p + jb_p$, the coordinates of the center and the radius of the admittance circle are transformed according to the following equations:

$$g_{c,new} = g_{c,old} - g_p; \tag{7}$$

$$b_{c,new} = b_{c,old} - b_p; \text{ and} \tag{8}$$

$$R_{new} = R_{old}; \tag{9}$$

where $g_{c,new}$ and $g_{c,old}$ are the real coordinates of the centers of the transformed circle and the circle corresponding to the previous reference plane, respectively; $b_{c,new}$ and $b_{c,old}$ are the imaginary coordinates of the centers of the transformed circle and the circle corresponding to the previous reference plane, respectively; and $R_{new}$ and $R_{old}$ are the radii of the transformed circle and the circle corresponding to the previous reference plane, respectively.

In instances of step 212 in which the successive reference plane is immediately downstream of a series component with impedance given by $z_s = r_s + jx_s$, the coordinates of the center and the radius of the admittance circle are transformed in four substeps according to the following equations:

Substep 1, translate by $j/x_s$:

$$g_1 = g_{old} - \frac{r_s}{r_s^2 + x_s^2}; \tag{10}$$

$$b_1 = b_{old} + \frac{x_s}{r_s^2 + x_s^2}; \tag{11}$$

and $$R_1 = R_{old}. \tag{12}$$

Substep 2, invert:

$$g_2 = \frac{g_1}{g_1^2 + b_1^2 - R_1^2}; \tag{13}$$

$$b_2 = \frac{-b_2}{g_1^2 + b_1^2 - R_1^2}; \tag{14}$$

and $$R_2 = \frac{R_1}{g_1^2 + b_1^2 - R_1^2}. \tag{15}$$

Substep 3, scale by $1/x_s^2$:

$$g_3 = g_2 \frac{x_s^2 - r_s^2}{(r_s^2 + x_s^2)^2} - x_2 \frac{2r_s x_s}{(r_s^2 + x_s^2)^2}; \tag{16}$$

$$b_3 = b_2 \frac{x_s^2 - r_s^2}{(r_s^2 + x_s^2)^2} + r_2 \frac{2r_s x_s}{(r_s^2 + x_s^2)^2}; \tag{17}$$

and $$R_3 = \frac{R_2}{r_s^2 + x_s^2}. \tag{18}$$

Substep 4, translate by $j/x_s$:

$$g_{new} = g_3 - \frac{r_s}{r_s^2 + x_s^2}; \tag{19}$$

$$b_{new} = b_3 + \frac{x_s}{r_s^2 + x_s^2}; \tag{20}$$

and $$R_{new} = R_3. \tag{21}$$

where $g_{c,new}$ and $g_{c,old}$ are the real coordinates of the centers of the transformed circle and the circle corresponding to the previous reference plane, respectively; $b_{c,new}$ and $b_{c,old}$ are the imaginary coordinates of the centers of the transformed circle and the circle corresponding to the previous reference plane, respectively; and $R_{new}$ and $R_{old}$ are the radii of the transformed circle and the circle corresponding to the previous reference plane, respectively.

The admittance circle corresponding to the last reference plane represents possible values of the antenna admittance.

Figure 3:
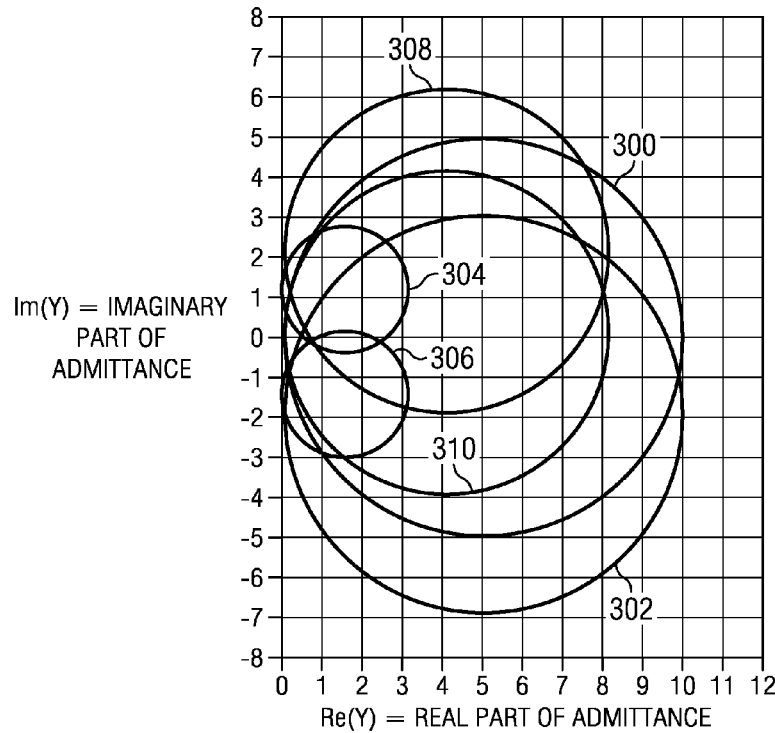
FIG. 3 is chart showing example admittance circles.

Admittance circles are depicted in FIG. 3, corresponding to the reference planes 130 through 140 of FIG. 1, for a first VSWR measurement. A first admittance circle 300 represents admittance value solutions to the first VSWR measurement at the first reference plane 130; that is, admittance values for the components downstream of the first reference plane 130 including the antenna 102. A second admittance circle 302 represents admittance value solutions to the first VSWR measurement at the second reference plane 132; that is, admittance values for the components downstream of the second reference plane 132 including the antenna 102. Similarly, a third admittance circle 304, a fourth admittance circle 306, a fifth admittance circle 308 and a sixth admittance circle 310 represent admittance value solutions to the first VSWR measurement for components downstream of the third reference plane 134, the fourth reference plane 136, the fifth reference plane 138 and the sixth reference plane 140, respectively. Because the antenna 102 is the only component downstream of the sixth reference plane 140, the sixth admittance circle 310 represents possible admittance values for the antenna 102 based on the first VSWR measurement, and is referred to generally as an RF component admittance circle 310 and more specifically as an antenna admittance circle 310.

After step 212 is completed so that the center coordinates and radius of the admittance circle corresponding to the last reference plane is computed, remaining iterations of VSWR measurements, corresponding to steps 204 through 214, are performed. For each VSWR measurement, an antenna admittance circle is provided which represents possible admittance values for the antenna 102. In alternate versions of the instant embodiment, more than three VSWR measurements may be performed.

Figure 4A:
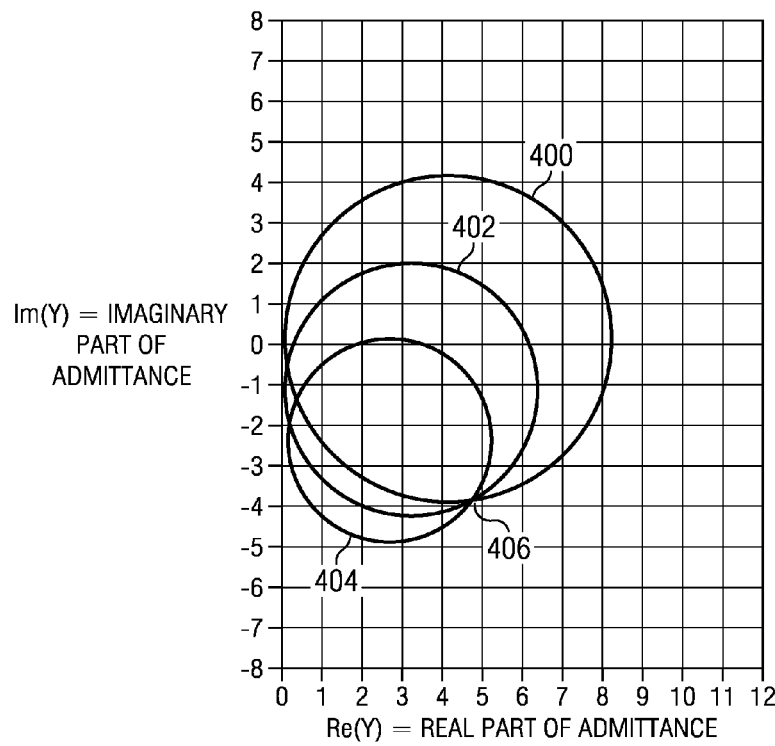
FIGS. 4A and 4B are admittance plane charts showing antenna admittance circles for three VSWR measurements.

After all VSWR measurements are completed, step 216 estimates the antenna admittance using intersections of the antenna admittance circles corresponding to the antenna admittance, which were computed in step 212. The antenna admittance may be estimated using, for example, a least squares method. FIG. 4A illustrates an admittance plane chart showing antenna admittance circles corresponding to the sixth reference plane 140 for three VSWR measurements. The first antenna admittance circle 400 corresponds to the first VSWR measurement, and corresponds to the sixth admittance circle 310 in FIG. 3. The second antenna admittance circle 402 corresponds to a second VSWR measurement for the RF circuit of FIG. 1. The third antenna admittance circle 404 corresponds to a third VSWR measurement for the RF circuit of FIG. 1. A point 406 at the three nearest intersections of the three antenna admittance circles 400, 402 and 404 corresponds to an estimate for the admittance value of the antenna 102.

Figure 4B:
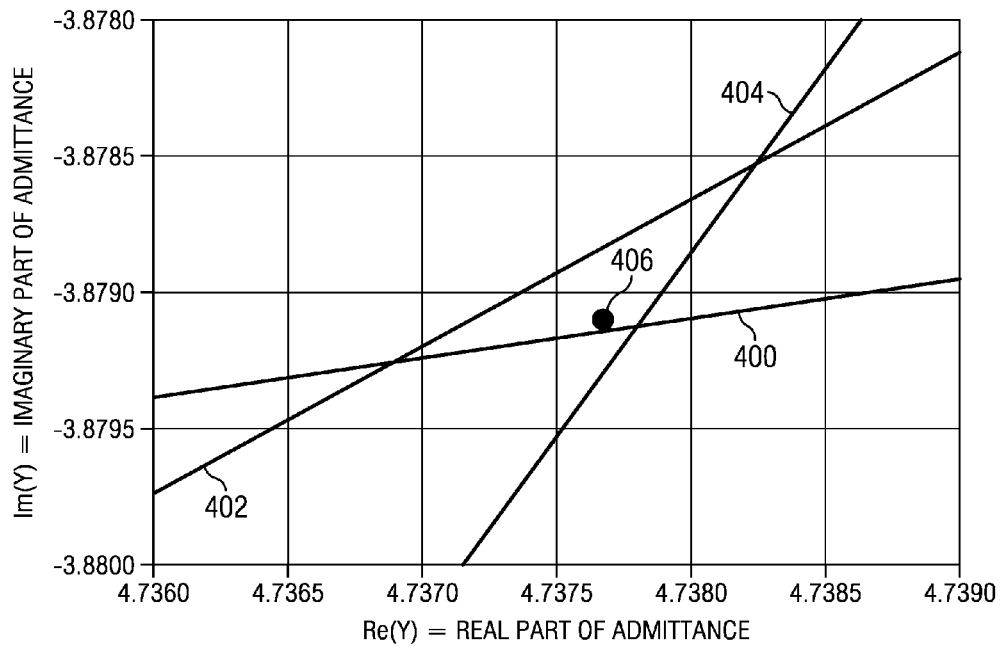

FIG. 4B is an enlargement of the area in FIG. 4A at the three nearest intersections of the three antenna admittance circles 400, 402 and 404. Antenna admittance circles may not necessarily intersect at a single point in the admittance plane, for example due to noise in the RF circuit 100 and possible errors in the models of the components in the ladder network 104. The estimated antenna impedance 406 may be chosen within an area bounded by the three antenna admittance circles 400, 402 and 404. The antenna impedance may be estimated from the nearest intersections of the antenna admittance circles using, for example, a least squares method. In the example, the antenna admittance is estimated to be 4.7377-3.8790j, as indicated by the point 406.

After the antenna admittance is estimated in step 216, an optional step 218 may be performed, which is to store the antenna admittance estimated value from step 216. The admittance estimated value may be stored, for example in a digital memory for later use in tuning the ladder network 104 as an impedance matching network between the power amplifier 116 and the antenna 102.

Figure 5A:
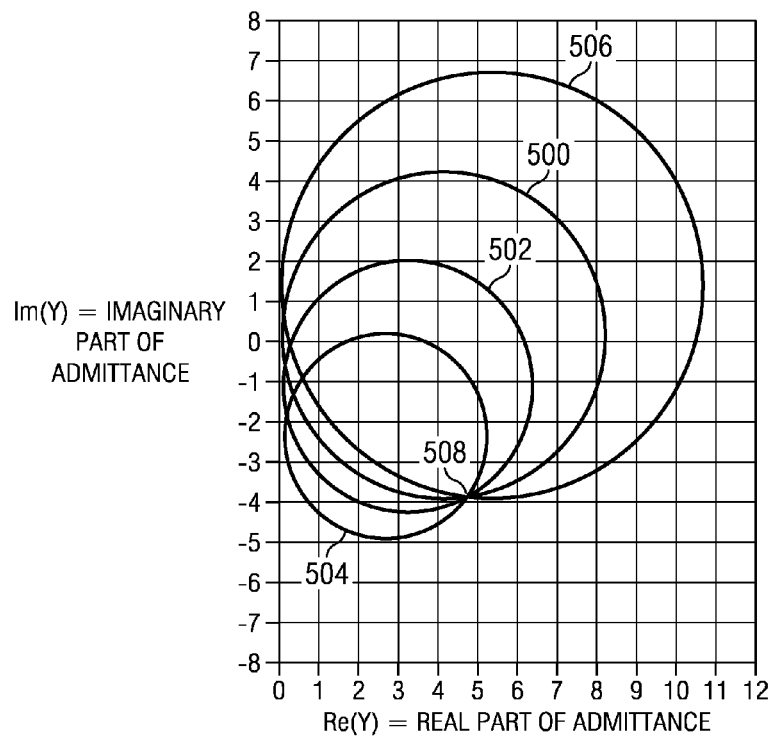
FIGS. 5A and 5B are admittance plane charts showing antenna admittance circles for four voltage standing wave ratio (VSWR) measurements.

The process described in reference to FIG. 2 may be performed so as to make four or more VSWR measurements and associated generation of antenna admittance circles. FIG. 5A is an admittance plane chart showing antenna admittance circles corresponding to the sixth reference plane 140 for four VSWR measurements. The first three VSWR measurements are described in reference to FIGS. 4A and 4B. The first antenna admittance circle 500 corresponds to the first VSWR measurement, and corresponds to the sixth admittance circle 310 in FIG. 3. The second antenna admittance circle 502 corresponds to a second VSWR measurement for the RF circuit of FIG. 1, and is shown as circle 402 in FIG. 4A. The third antenna admittance circle 504 corresponds to a third VSWR measurement for the RF circuit of FIG. 1, and is shown as circle 404 in FIG. 4A. The fourth antenna admittance circle 506 corresponds to a fourth VSWR measurement for the RF circuit of FIG. 1. A point 508 at the four nearest intersections of the four antenna admittance circles 500, 502, 504 and 506 corresponds to an estimate for the admittance value of the antenna 102.

Figure 5B:
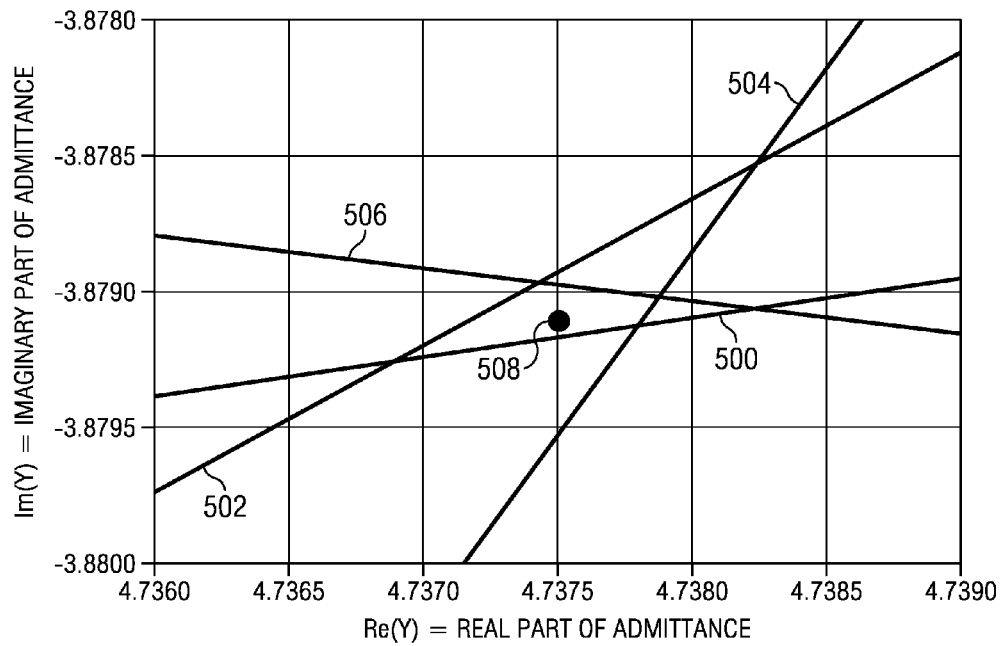

FIG. 5B is an enlargement of the area in FIG. 5A at the four nearest intersections of the three antenna admittance circles 500, 502, 504 and 506. The estimated antenna impedance 508 may be chosen within an area bounded by the four antenna admittance circles 500, 502, 504 and 506. In the instant embodiment, the antenna admittance is estimated to be 4.7375-3.8791j, as indicated by the point 508, and may be a more accurate estimate than that provided by the three VSWR measurements described in reference to FIGS. 4A and 4B.

Figure 6:
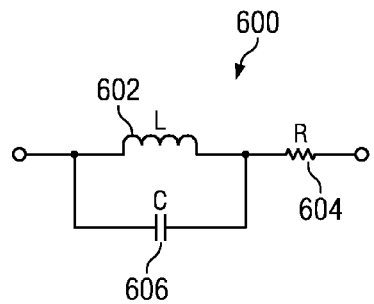
FIG. 6 depicts an example lumped parameter circuit model for a series component of a ladder network in an embodiment.

FIG. 6 depicts an example lumped parameter circuit model 600 for a series component of a ladder network in an embodiment. The circuit model 600 includes an inductance 602, with value L in FIG. 6. The circuit model 600 also includes a resistance 604, with value R, in series with the inductance 602. The circuit model 600 further includes a shunt capacitance 606, with value C, in parallel with the inductance 602. An impedance Z of the series component circuit model 600 may be expressed as:

$$Z = R + j\frac{\omega L}{\omega^2 LC - 1}; \quad (22)$$

where ω is an angular frequency of a signal applied to the circuit model 600.

In one version of the instant embodiment, a value of ωL is at least a factor of ten greater than a value of R and a value of 1/ωC, for a signal with a frequency of interest for an RF circuit containing a series element with the circuit model 600.

Figure 7:
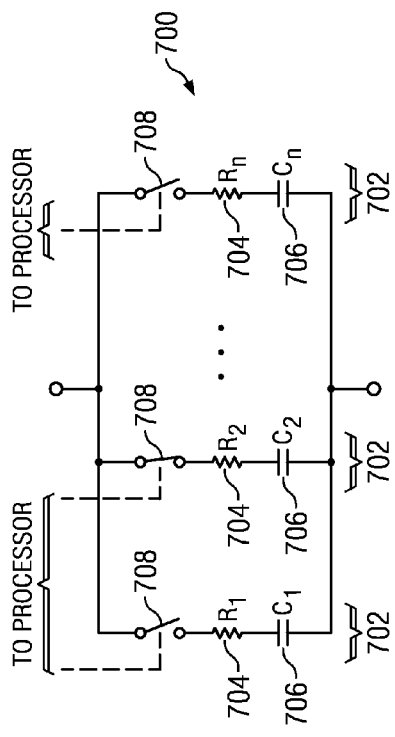
FIG. 7 depicts an example lumped parameter circuit model for a tunable parallel component of a ladder network in an embodiment.

FIG. 7 depicts a first example lumped parameter circuit model 700 for a tunable parallel component of a ladder network in an embodiment. The circuit model 700 includes a plurality of parallel legs 702. Each parallel leg 702 includes a resistance 704, with a value $R_1$ in a first instance of the parallel legs 702, a value of $R_2$ in a second instance, and so on to a value of $R_n$ in a last, nth, instance of the parallel legs 702. Each parallel leg 702 also includes a capacitance 706 in series with the resistance 704. The capacitances 706 have a value $C_1$ in the first instance of the parallel legs 702, a value of $C_2$ in the second instance, and so on, to a value of $C_n$ in the nth last instance of the parallel legs 702. Each parallel leg 702 further includes a single-pole single-throw switch 708 in series with the resistance 704. Physical switches corresponding to the model switches 708 are controlled by a processor of an RF circuit containing a parallel element with the circuit model 700. An admittance $Y_{leg}$ of an instance of the parallel legs 702 in which the switch 708 is closed may be expressed as:

$$Y_{leg} = \frac{R(\omega C)^2 + j\omega C}{1 + (\omega RC)^2}; \quad (23)$$

where ω is an angular frequency of a signal applied to the circuit model 700; R is the value of the resistance 704 in the instant leg 702; and C is the value of the capacitance 706 in the instant leg 702.

In one version of the instant embodiment, a value of 1/ωC is at least a factor of ten greater than a value of R, for a signal with a frequency of interest for an RF circuit containing a series element with the circuit model 700. An admittance $Y_{leg}$ of an instance of the parallel legs 702 in which the switch 708 is open is considered to be much less, for example zero, or in another example, a finite value $Y_{open}$, than the admittance in which the switch is closed. An admittance Y of the tunable parallel component circuit model 700 may be expressed as a sum of all the leg admittances $Y_{leg}$ for instances of the parallel legs 702.

In one version of the circuit model 700, all instances of the capacitance 706 may be substantially equal, and all instances of the resistance 704 may be substantially equal. In this version, the admittance Y of the tunable parallel component circuit model 700 may be expressed as:

$$Y = N_{closed}\frac{R(\omega C)^2 + j\omega C}{1 + (\omega RC)^2} + N_{open}Y_{open}; \quad (24)$$

where $N_{closed}$ is the number of parallel legs 702 with closed switches 708; and $N_{open}$ is the number of parallel legs 702 with open switches 708.

In another version of the circuit model 700, instances of the capacitances 706 may have different values (for example, values 1, 2, 4, 8, etc., proportional to sequential powers of 2) so that a desired value in a range of capacitance in the admittance Y of the tunable parallel component circuit model 700 may be provided by appropriately closing certain instances of the switches 708.

Figure 8:
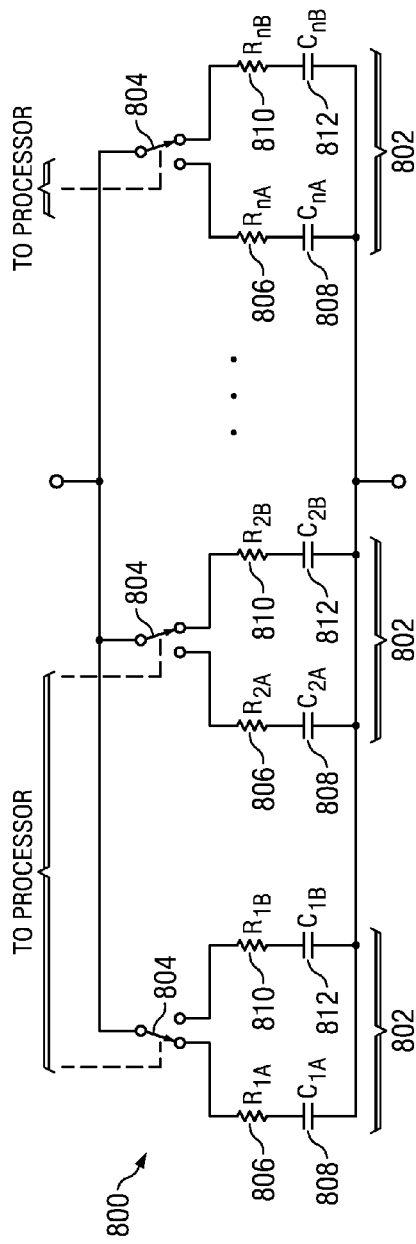
FIG. 8 depicts an example lumped parameter circuit model for a tunable parallel component of a ladder network in another embodiment.

FIG. 8 depicts a first example lumped parameter circuit model 800 for a tunable parallel component of a ladder network in another embodiment. The circuit model 800 includes plurality of parallel legs 802. Each parallel leg 802 includes a single-pole double-throw switch 804 in which a common contact is connected to a first terminal of the parallel component. A first branch of each switch 804 is connected to a first resistance 806, with a value $R_{1A}$ in a first instance of the parallel legs 802, a value of $R_{2A}$ in a second instance, and so on to a value of $R_{nA}$ in a last, nth, instance of the parallel legs 802, in series with a first capacitance 808, with a value $C_{1A}$ in a first instance of the parallel legs 802, a value of $C_{2A}$ in a second instance, and so on to a value of $C_{nA}$ in a last, nth, instance of the parallel legs 802. A second branch of each switch 804 is connected to a second resistance 810, with a value $R_{1B}$ in a first instance of the parallel legs 802, a value of $R_{2B}$ in a second instance, and so on to a value of $R_{nB}$ in a last, nth, instance of the parallel legs 802, in series with a second capacitance 808, with a value $C_{1B}$ in a first instance of the parallel legs 802, a value of $C_{2B}$ in a second instance, and so on to a value of $C_{nB}$ in a last, nth, instance of the parallel legs 802.

In one version of the instant embodiment, the second capacitance 812 value in each leg 802 may be at least twice as large as the first capacitance 808 value in the same leg 802. In one version of the instant embodiment, values of the first capacitance 808 in each leg 802 may be equal to each other, and values of the second capacitance 812 in each leg 802 may be equal to each other. A physical tunable parallel component corresponding to the circuit model 800 may be realized in a microelectromechanical system (MEMS) device, in which a plurality of identical movable capacitor electrodes are each disposed in either of two positions according to control voltages, so as to provide a range of capacitance values.

Physical switches corresponding to the model switches 804 are controlled by a processor of an RF circuit containing a parallel element with the circuit model 800. When an instance of the switches 804, is set to a first position so as to contact the first branch, an admittance $Y_a$ of the parallel leg 802 containing the switch may be expressed as:

$$Y_{leg} = \frac{R_a(\omega C_a)^2 + j\omega C_a}{1 + (\omega R_a C_a)^2}; \tag{25}$$

where $\omega$ is an angular frequency of a signal applied to the circuit model 800; $R_a$ is the value of the resistance 806 in the first branch of the instant leg 802; and $C_a$ is the value of the capacitance 808 in the first branch of the instant leg 802.

Similarly, when an instance of the switches 804 is set to a second position so as to contact the second branch, an admittance $Y_b$ of the parallel leg 802 containing the switch may be expressed as:

$$Y_{leg} = \frac{R_b(\omega C_b)^2 + j\omega C_b}{1 + (\omega R_b C_b)^2}; \tag{26}$$

where $R_b$ is the value of the resistance 806 in the second branch of the instant leg 802; and $C_b$ is the value of the capacitance 808 in the second branch of the instant leg 802.

An admittance Y of the tunable parallel component circuit model 800 may be expressed as a sum of all the leg admittances $Y_{leg}$ for instances of the parallel legs 802. In a version of the instant embodiment in which values of the corresponding instances of the first resistance 806, the first capacitance 808, the second resistance 810 and second capacitance 812 in each leg 802 are equal to each other, the admittance Y of the tunable parallel component circuit model 800 may be expressed as:

$$Y = N_a \frac{R_a(\omega C_a)^2 + j\omega C_a}{1 + (\omega R_a C_a)^2} + N_b \frac{R_b(\omega C_b)^2 + j\omega C_b}{1 + (\omega R_b C_b)^2}; \tag{27}$$

where $N_a$ is the number of switches 804 set to contact the first branch; and $N_b$ the number of switches 804 set to contact the second branch.

Figure 9:
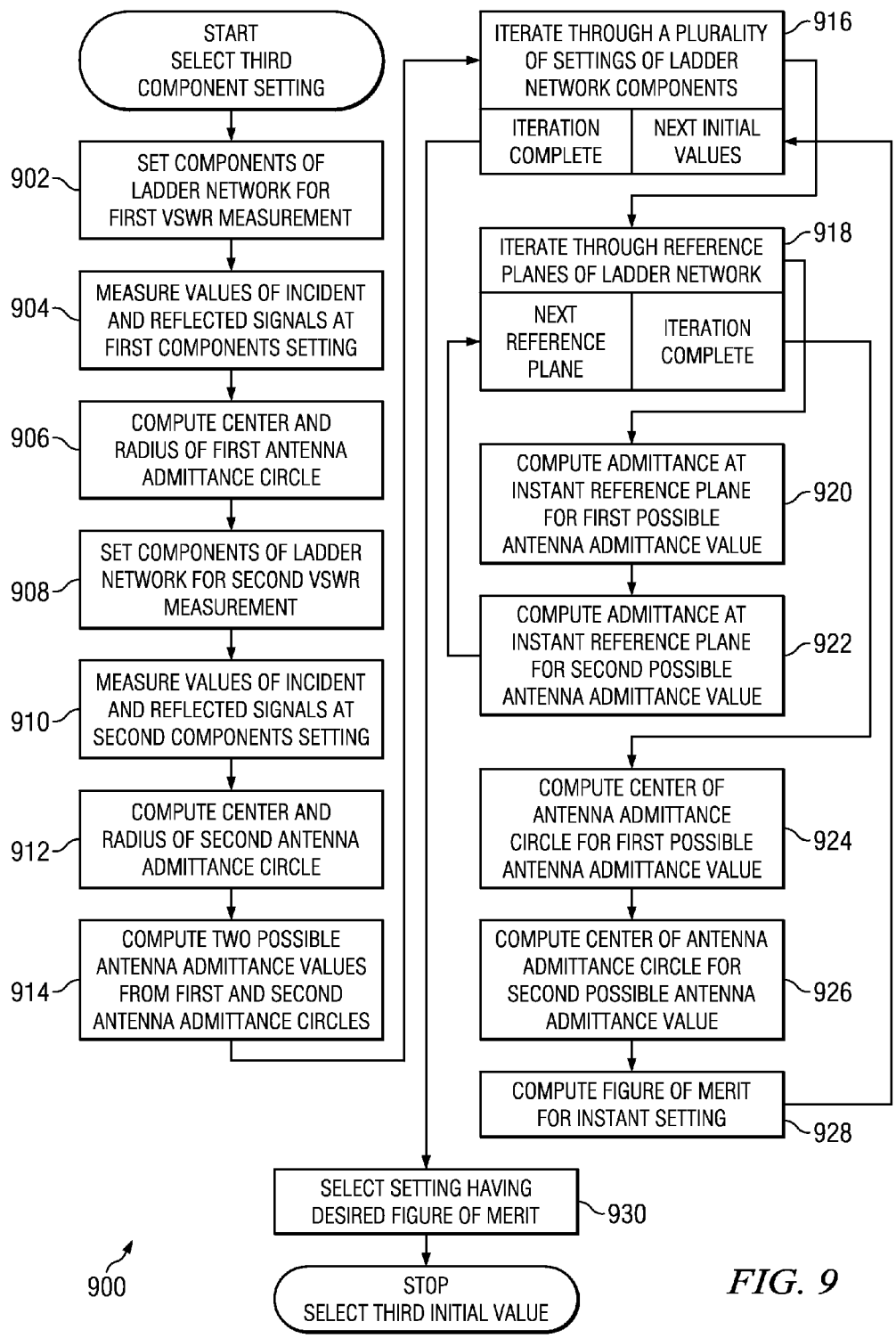
FIG. 9 is a flowchart of an example process to select a third component setting.

The process of estimating an admittance of an RF component described herein may be improved by setting components of a ladder network for a third VSWR measurement and possibly a fourth VSWR measurement, based on results from two VSWR measurements. FIG. 9 is a flowchart of a process to select a third component setting. The process 900 begins with step 902 to set components of the ladder network for a first VSWR measurement. The components may be set, for example, to provide a minimum or a low value of capacitance for each component of the range of capacitance values available. Step 904 is to measure incident and reflected signals for the first VSWR measurement at the first components setting.

Step 906 is to compute a center and radius of a first antenna admittance circle for the first VSWR measurement, for example using the process described in reference to FIG. 2.

Subsequently, step 908 is to set components of the ladder network for a second VSWR measurement. The components may be set, for example, to provide a mid-range value of capacitance for each component of the range of capacitance values available. Step 910 is to measure incident and reflected signals for the second VSWR measurement at the second components setting. Step 912 is to compute a center and radius of a second antenna admittance circle for the second VSWR measurement. After the centers and radii of the first and second antenna admittance circles are computed, a first and second possible antenna admittance value are computed at intersections of the first and second antenna admittance circles in step 914.

Subsequently, step 916 is to iterate through a plurality, and possibly all, of settings of the ladder network components. In each iteration, steps 918 through 928 are performed. Step 918 is to iterate through the reference planes of the ladder network, starting with the antenna reference plane. In each iteration, steps 920 and 922 are performed. Step 920 is to compute an admittance at the instant reference plane, assuming the actual antenna admittance is the first possible antenna admittance value as computed in step 914. For reference planes which are upstream of a parallel component with admittance $y_{parallel} = g_{parallel} + jb_{parallel}$, the admittance $y_{new}$ is computed using the expression:

$$y_{new} = y_{parallel} + y_{old}; \tag{28}$$

where $y_{old}$ is an admittance at a reference plane immediately downstream of the instant reference plane.

For reference planes which are upstream of a series component with impedance $z_{series} = r_{series} + jx_{series}$, the admittance $y_{new}$ is computed using the expression:

$$y_{new} = \frac{1}{(1/y_{old}) + z_{series}}; \tag{29}$$

where $y_{old}$ is the admittance at the reference plane immediately downstream of the instant reference plane.

Step 922 is to compute an admittance at the instant reference plane, assuming the actual antenna admittance is the second possible antenna admittance value as computed in step 914, using the expressions described in reference to step 920. When the iterations in step 918 are completed, step 924 is to compute coordinates of a center of an admittance circle for an estimated VSWR value $VSWR_{estimated}$ of the instant component setting, assuming the actual antenna admittance is the first possible antenna admittance value as computed in step 914. An estimated reflection coefficient $\Gamma_{estimated}$ is computed using the expression:

$$\Gamma_{estimated} = \left| \frac{1 - y_{network}}{1 + y_{network}} \right|; \tag{30}$$

where $y_{network}$ is the admittance at the first reference plane, defined as being immediately upstream of the ladder network, computed in a last iteration of step 920.

The estimated VSWR value $VSWR_{estimated}$ is computed using the expression:

$$VSWR_{estimated} = \frac{1 + |\Gamma_{estimated}|}{1 - |\Gamma_{estimated}|}. \quad (31)$$

The coordinates of the center of the admittance circle for the estimated VSWR value $VSWR_{estimated}$ assuming the actual antenna admittance is the first possible antenna admittance value are computed using the process described in reference to steps 210 through 214 of FIG. 2. Step 926 is to compute coordinates of a center of an admittance circle for an estimated VSWR value $VSWR_{estimated}$ of the instant component setting, assuming the actual antenna admittance is the second possible antenna admittance value as computed in step 914, using the expressions described in reference to step 924.

Figure 10A:
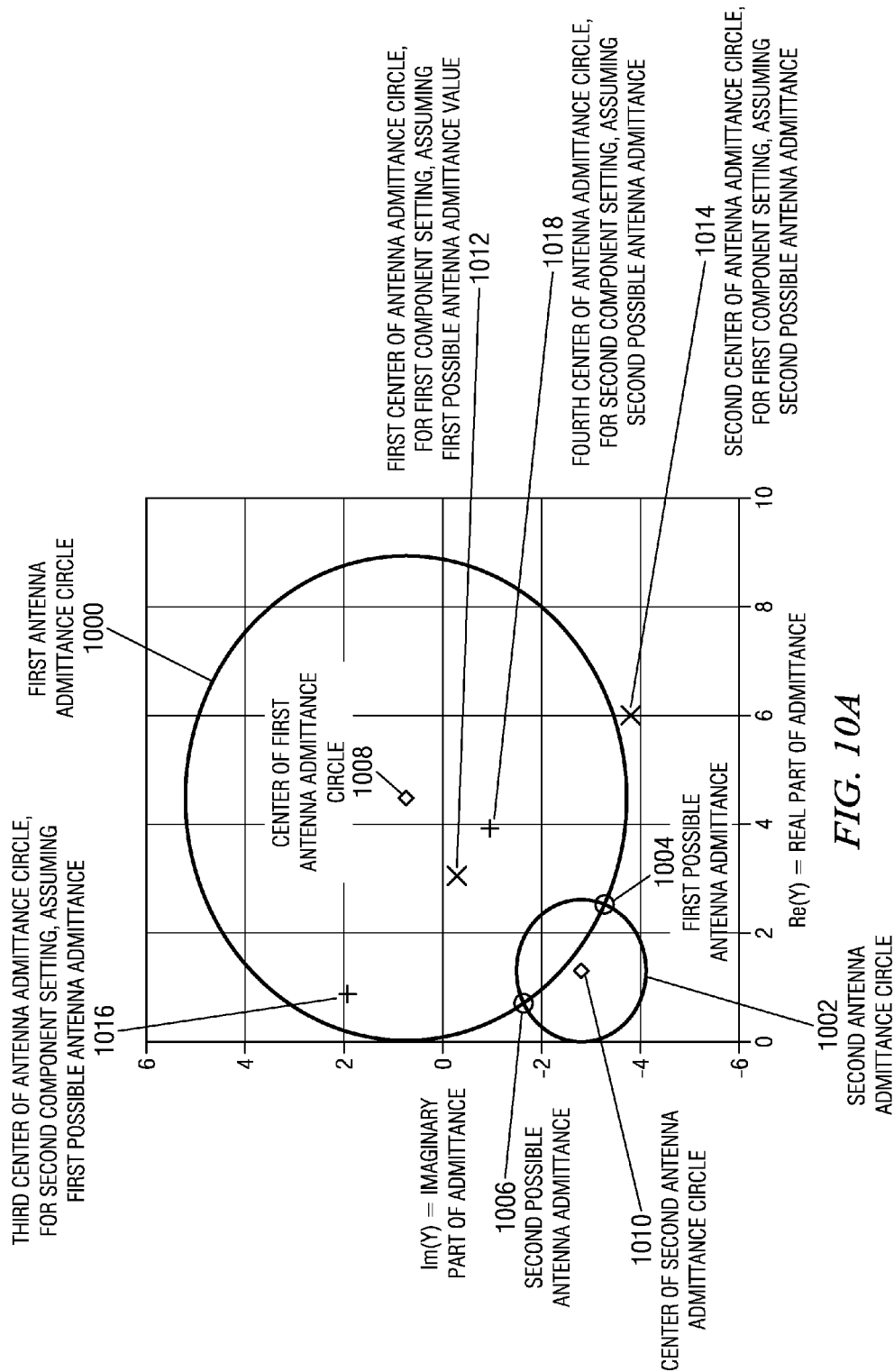
FIGS. 10A-10C show an admittance plane with centers of antenna admittance circles.

FIG. 10A shows an admittance plane with a first antenna admittance circle 1000 resulting from a first VSWR measurement, and a second antenna admittance circle 1002 resulting from a second VSWR measurement, as described in reference to steps 902 through 912. A first possible antenna admittance value 1004 and a second possible antenna admittance value 1006 are at intersections of the first antenna admittance circle 1000 and second antenna admittance circle 1002. The first antenna admittance circle 1000 has a first center 1008 and the second antenna admittance circle 1002 has a second center 1010, as describe in reference to step 914.

A first setting of the ladder network components provides a first center of a possible antenna admittance circle 1012 for the case in which the actual antenna admittance is the first possible antenna admittance value 1004, and a second center of a possible antenna admittance circle 1014 for the case in which the actual antenna admittance is the second possible antenna admittance value 1006, as described in reference to steps 916 through 924. Similarly, a second setting of the ladder network components provides a third center of a possible antenna admittance circle 1016 for the case in which the actual antenna admittance is the first possible antenna admittance value 1004, and a fourth center of a possible antenna admittance circle 1018 for the case in which the actual antenna admittance is the second possible antenna admittance value 1006. Additional settings of the ladder network components provide further possible antenna admittance circles, not shown.

Figure 10B:
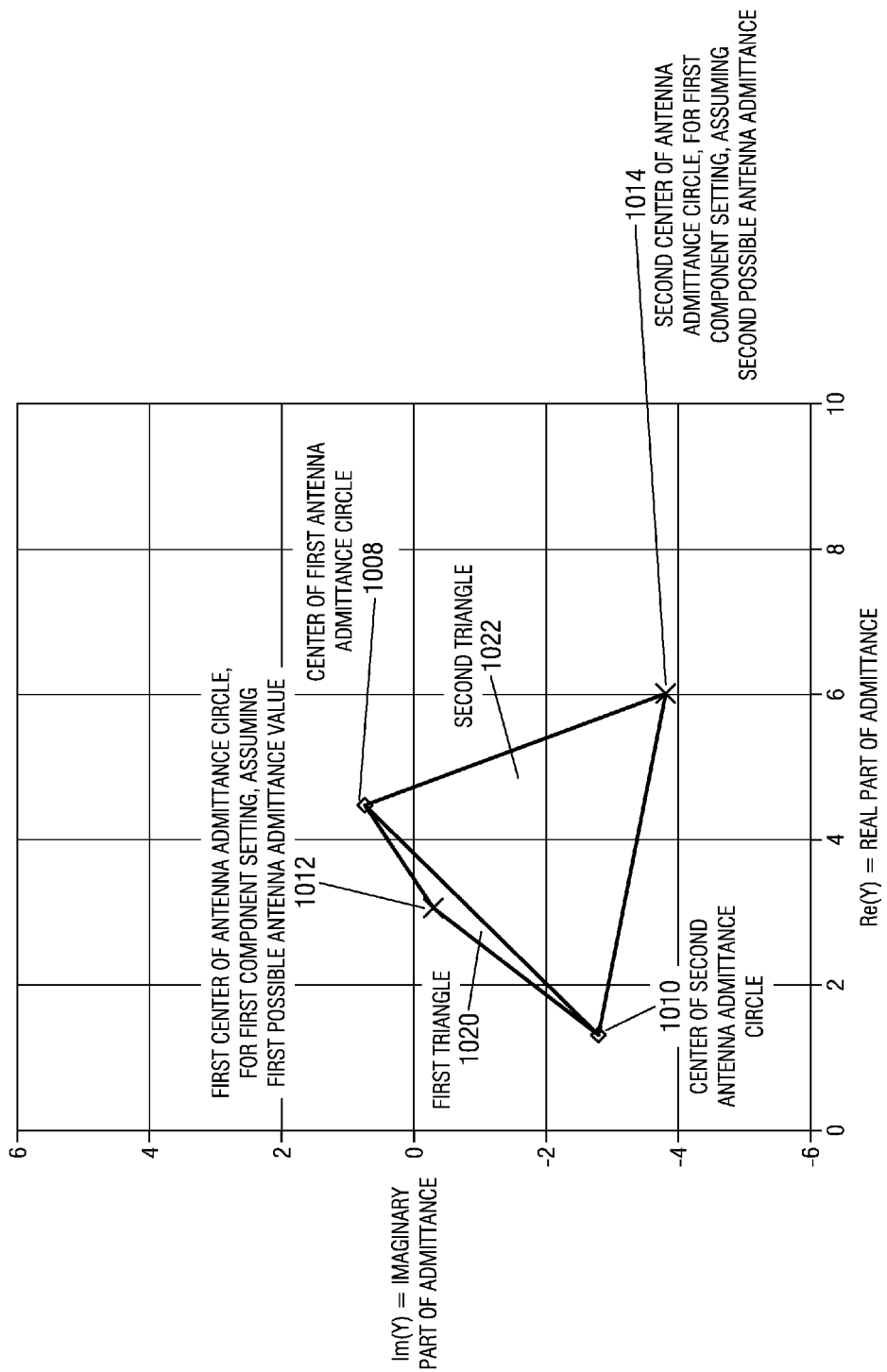

Subsequent to steps 924 and 926, step 928 is to compute a figure of merit for the instant setting of the network components. Referring to FIG. 10B, an example figure of merit for the first setting may be provided by examining a first triangle 1020 in the admittance plane whose vertices are the first center 1008 of the first antenna admittance circle 1000, the second center 1010 of the second antenna admittance circle 1002, and the first center of a possible antenna admittance circle 1012 for the case in which the actual antenna admittance is the first possible antenna admittance value 1004, and a second triangle 1022 whose vertices are the first center 1008 of the first antenna admittance circle 1000, the second center 1010 of the second antenna admittance circle 1002, and the second center of a possible antenna admittance circle 1014 for the case in which the actual antenna admittance is the second possible antenna admittance value 1006. A first value of the example figure of merit may be a measure of deviation of the first triangle 1020 and the second triangle 1022 from an equilateral triangle. A first value of the figure of merit, FOM, may be computed using the following expression:

$$FOM = \left(\theta_{1,1} - \frac{\pi}{3}\right)^2 + \left(\theta_{2,1} - \frac{\pi}{3}\right)^2 + \\ \left(\theta_{3,1} - \frac{\pi}{3}\right)^2 + \left(\theta_{1,2} - \frac{\pi}{3}\right)^2 + \left(\theta_{2,2} - \frac{\pi}{3}\right)^2 + \left(\theta_{3,2} - \frac{\pi}{3}\right)^2; \quad (32)$$

where $\theta_{1,1}$ is an angle of the first triangle 1020 at the vertex at the first center 1008 of the first antenna admittance circle 1000; $\theta_{2,1}$ is an angle of the first triangle 1020 at the vertex at the second center 1010 of the second antenna admittance circle 1002; $\theta_{3,1}$ is an angle of the first triangle 1020 at the vertex at the first center of a possible antenna admittance circle 1012 for the case in which the actual antenna admittance is the first possible antenna admittance value 1004; $\theta_{1,2}$ is an angle of the second triangle 1022 at the vertex at the first center 1008 of the first antenna admittance circle 1000; $\theta_{2,2}$ is an angle of the second triangle 1022 at the vertex at the second center 1010 of the second antenna admittance circle 1002; and $\theta_{3,2}$ is an angle of the second triangle 1022 at the vertex at the second center of a possible antenna admittance circle 1014 for the case in which the actual antenna admittance is the second possible antenna admittance value 1006.

Figure 10C:
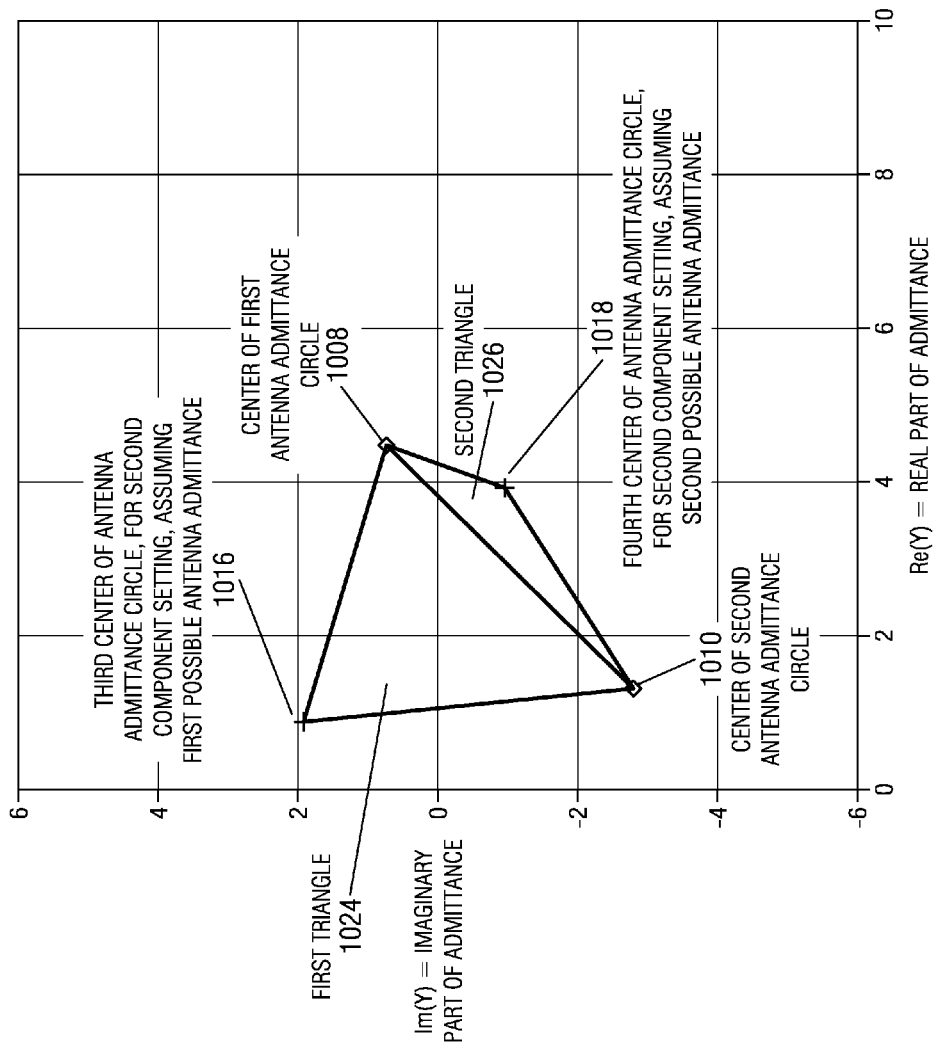

For the first setting of the network components, the first triangle 1020 and second triangle 1022 depicted in FIG. 10B provide the first value for the figure of merit of 4.6140. FIG. 10C shows a corresponding first triangle 1024 and a second triangle 1026 for a second setting of the ladder network components. A second value of the figure of merit, 3.2798, may be provided by the second setting of the network components, using the triangles 1024 and 1026, following the steps recited above.

Subsequent to completing step 916 for the plurality of settings of the ladder network components, step 930 is to select a setting with the best figure of merit. A lower value of the figure of merit is preferred for a third VSWR measurement, so as to increase a probability of obtaining an accurate value of the antenna admittance. In this example, the second setting of the ladder network is preferred, as it provides the lowest value of the figure of merit.

Figure 11:
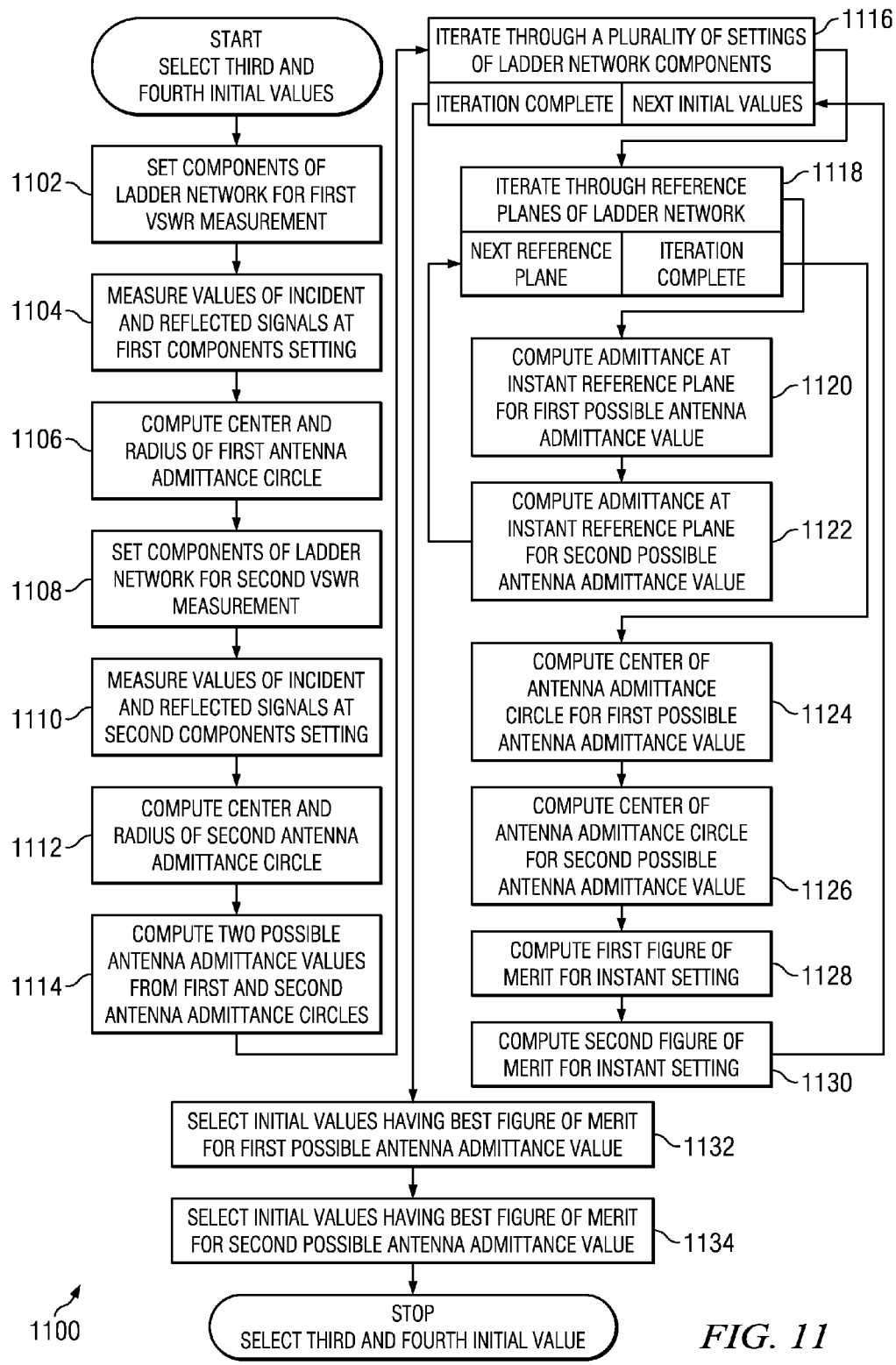
FIG. 11 is a flowchart of a process to select a third and a fourth component setting.

An alternate process of selecting a third setting and a fourth setting for the ladder network components for a third VSWR measurement and a fourth VSWR measurement, respectively, is described in reference to FIG. 11. The process 1100 begins with steps 1102 through 1114 which are similar to steps 902 through 914 and which provide a first possible antenna admittance value and a second possible antenna admittance value. Subsequently, step 1116 is to iterate through a plurality, and possibly all, of settings of the ladder network components. In each iteration, steps 1118 through 1128 are performed. Step 1118 is to iterate through the reference planes of the ladder network, starting with the antenna reference plane. In each iteration, steps 1120 and 1122 are performed. Step 1120 is to compute an admittance at the instant reference plane, assuming the actual antenna admittance is the first possible antenna admittance value as computed in step 1114. Step 1120 is performed as described in reference to step 920. Similarly, step 1122 is to compute an admittance at the instant reference plane, assuming the actual antenna admittance is the second possible antenna admittance value as computed in step 1114, and is performed as described in reference to step 922. When the iterations in step 1118 are completed, step 1124 is to compute coordinates of a center of an admittance circle for an estimated VSWR value $VSWR_{estimated}$ of the instant component setting, assuming the actual antenna admittance is the first possible antenna admittance value as computed in step 1114. Step 1124 is performed as described in reference to step 924. Similarly, step 1126 is to compute coordinates of a center of an admittance circle for an estimated VSWR value VSWR$_{estimated}$ of the instant component setting, assuming the actual antenna admittance is the second possible antenna admittance value as computed in step 1114, and is performed as described in reference to step 926.

Subsequently, step 1128 is to compute a first figure of merit value, FOM$_1$, for the instant setting of the ladder network components, using the first possible antenna admittance value 1004. The first figure of merit value may be computed according to the expression:

$$FOM_1 = \left(\theta_{1,1} - \frac{\pi}{3}\right)^2 + \left(\theta_{2,1} - \frac{\pi}{3}\right)^2 + \left(\theta_{3,1} - \frac{\pi}{3}\right)^2; \quad (33)$$

where $\theta_{1,1}$ is an angle of the first triangle 1020 at the vertex at the first center 1008 of the first antenna admittance circle 1000; $\theta_{2,1}$ is an angle of the first triangle 1020 at the vertex at the second center 1010 of the second antenna admittance circle 1002; and $\theta_{3,1}$ is an angle of the first triangle 1020 at the vertex at the first center of a possible antenna admittance circle 1012 for the case in which the actual antenna admittance is the first possible antenna admittance value 1004.

For the first setting of the ladder network components, the first figure of merit value FOM$_1$ is computed to be 4.6145. For the second setting of the ladder network components, the first figure of merit value FOM$_1$ is computed to be 0.0756.

Step 1130 is to compute a second figure of merit value, FOM$_1$, for the instant setting of the ladder network components, using the second possible antenna admittance value 1006. The second figure of merit value may be computed according to the expression:

$$FOM_2 = \left(\theta_{1,2} - \frac{\pi}{3}\right)^2 + \left(\theta_{2,2} - \frac{\pi}{3}\right)^2 + \left(\theta_{3,2} - \frac{\pi}{3}\right)^2; \quad (34)$$

where $\theta_{1,2}$ is an angle of the second triangle 1022 at the vertex at the first center 1008 of the first antenna admittance circle 1000; $\theta_{2,2}$ is an angle of the second triangle 1022 at the vertex at the second center 1010 of the second antenna admittance circle 1002; and $\theta_{3,2}$ is an angle of the second triangle 1022 at the vertex at the second center of a possible antenna admittance circle 1014 for the case in which the actual antenna admittance is the second possible antenna admittance value 1006.

For the first setting of the ladder network components, the second figure of merit value FOM$_2$ is computed to be 0.000206. For the second setting of the ladder network components, the second figure of merit value FOM$_1$ is computed to be 3.2042. Further settings of the ladder network components may provide additional values of the first figure of merit value FOM$_1$ and the second figure of merit value FOM$_2$.

Subsequent to completing step 1116 for the plurality of settings of the ladder network components, step 1132 is to select a setting with the best first figure of merit value. A lower value of the first figure of merit FOM$_1$ is preferred for a third VSWR measurement, so as to increase a probability of obtaining an accurate value of the antenna admittance. In this example, the second setting of the ladder network is preferred, as it provides the lowest value of the first figure of merit.

Similarly, step 1134 is to select a setting with the best second figure of merit value. A lower value of the second figure of merit FOM$_2$ is preferred for a fourth VSWR measurement, so as to increase a probability of obtaining an accurate value of the antenna admittance. In this example, the first setting of the ladder network is preferred, as it provides the lowest value of the second figure of merit.

Those skilled in the art will appreciate that other embodiments and variations are possible within the scope of the claimed invention.

What is claimed is:

1. A process of estimating an admittance of a radio frequency (RF) component, comprising the steps of:
providing a ladder network coupled to said RF component, said ladder network including alternating series components and parallel components, in which at least one of said series components and parallel components is tunable;
providing a directional coupler coupled to said ladder network opposite from said RF component;
providing a signal source coupled to said directional coupler opposite from said ladder network, so that said directional coupler provides an incident signal which is related to an amplitude of an incident signal from said signal source and provides a reflected signal which is related to an amplitude of a reflected signal from said ladder network;
providing an RF voltmeter configured to receive said incident signal and said reflected signal and to provide a power meter output signal;
providing a processor configured to receive said power meter output signal and to adjust admittance values of said at least one tunable component in said ladder network;
performing three voltage standing wave ratio (VSWR) measurements, in which each VSWR measurement includes the steps of:
said processor adjusting said admittance values of said at least one tunable component of said ladder network to desired values;
said signal source providing a signal at a desired frequency;
said directional coupler providing an incident signal and a reflected signal to said RF voltmeter;
computing a magnitude of a ratio of said reflected signal to said incident signal so as to provide a reflection coefficient magnitude value $|\Gamma|$;
computing a VSWR value using said incident signal and said reflected signal according to the equation:

$$VSWR = \frac{1 + |\Gamma|}{1 - |\Gamma|};$$

computing a center ($g_c$, $b_c$) and a radius $R_c$ of an admittance circle in a complex admittance plane at a first reference plane defined at an incident side of said ladder network, and
iterating through successive reference planes defined in said ladder network and transforming said coordinates of said center and said radius of said admittance circle at each said successive reference plane, wherein each said successive reference plane is defined downstream of an immediately previous reference plane by one of said alternating series components and parallel components in said ladder network, so that a last of said reference planes is immediately upstream of said RF component and immediately downstream of said ladder network.

2. The process of claim 1, in which:

said step of transforming said coordinates of said center and said radius at a reference plane immediately downstream of a said parallel component, said parallel component having admittance given by $y_p=g_p+jb_p$, is performed according to the following equations:

$$g_{c,new}=g_{c,old}-g_p$$

$$b_{c,new}=b_{c,old}-b_p$$

$$R_{new}=R_{old}$$

where: $g_{c,new}$ and $g_{c,old}$ are the real coordinates of the centers of the transformed circle and the circle corresponding to the previous reference plane, respectively, $b_{c,new}$ and $b_{c,old}$ are the imaginary coordinates of the centers of the transformed circle and the circle corresponding to the previous reference plane, respectively, and $R_{new}$ and $R_{old}$ are the radii of the transformed circle and the circle corresponding to the previous reference plane, respectively;

said step of transforming said coordinates of said center and said radius at a reference plane immediately downstream of a said series component, said series component having impedance given by $z_s=r_s+jx_s$, is performed in four sub-steps according to the following equations:

sub-step 1, translate by $j/x_s$:

$$g_1 = g_{old} - \frac{r_s}{r_s^2 + x_s^2}$$

$$b_1 = b_{old} + \frac{x_s}{r_s^2 + x_s^2}$$

$$R_1 = R_{old}$$

sub-step 2, invert:

$$g_2 = \frac{g_1}{g_1^2 + b_1^2 - R_1^2}$$

$$b_2 = \frac{-b_1}{g_1^2 + b_1^2 - R_1^2}$$

$$R_2 = \frac{R_1}{g_1^2 + b_1^2 - R_1^2}$$

sub-step 3, scale by $1/x_s^2$:

$$g_3 = g_2 \frac{x_s^2 - r_s^2}{(r_s^2 + x_s^2)^2} - x_2 \frac{2r_s x_s}{(r_s^2 + x_s^2)^2}$$

$$b_3 = b_2 \frac{x_s^2 - r_s^2}{(r_s^2 + x_s^2)^2} + r_2 \frac{2r_s x_s}{(r_s^2 + x_s^2)^2}$$

$$R_3 = \frac{R_2}{r_s^2 + x_s^2}$$

sub-step 4, translate by $j/x_s$:

$$g_{new} = g_3 - \frac{r_s}{r_s^2 + x_s^2}$$

$$b_{new} = b_3 + \frac{x_s}{r_s^2 + x_s^2}$$

$$R_{new} = R_3$$

where: $g_{c,new}$ and $g_{c,old}$ are the real coordinates of the centers of the transformed circle and the circle corresponding to the previous reference plane, respectively, $b_{c,new}$ and $b_{c,old}$ are the imaginary coordinates of the centers of the transformed circle and the circle corresponding to the previous reference plane, respectively, and $R_{new}$ and $R_{old}$ are the radii of the transformed circle and the circle corresponding to the previous reference plane, respectively; and said center and said radius at said last reference plane immediately upstream of said RF component define an RF component admittance circle in said complex admittance plane; and estimating an admittance of said RF component using three nearest intersections of said three RF component admittance circles.

3. The process of claim 1, in which said RF component is an antenna and said signal source is an RF power amplifier.

4. The process of claim 1, in which said ladder network has a pi topology, so that:

a first component of said alternating series components and parallel components immediately downstream from said signal source is a parallel component; and a last component of said alternating series components and parallel components immediately upstream of said RF component is a parallel component.

5. The process of claim 4, in which:

said ladder network has five components;

said first component immediately downstream of said signal source includes a capacitor;

said second component immediately downstream of said first component includes and inductor;

said third component immediately downstream of said second component includes a capacitor;

said fourth component immediately downstream of said third component includes and inductor; and said fifth component immediately downstream of said fourth component includes a capacitor.

6. The process of claim 1, in which said ladder network has a tee topology, so that:

a first component of said alternating series components and parallel components immediately downstream from said signal source is a series component; and a last component of said alternating series components and parallel components immediately upstream of said RF component is a series component.

7. The process of claim 1, in which each of said series components of said ladder network includes an inductor.

8. The process of claim 7, in which a circuit model of each of said series components includes an inductor in series with a resistor, and a capacitor in parallel with said inductor.

9. The process of claim 1, in which each of said parallel components of said ladder network includes a capacitor.

10. The process of claim 1, in which:

each of said parallel components of said ladder network includes a capacitor; and at least one of said parallel components includes at least one capacitor in series with a switch, said switch being controlled by said processor.

11. The process of claim 10, in which said at least one of said parallel components includes a plurality of parallel legs, each leg including a capacitor and a single-pole single-throw switch in series with said capacitor, said single-pole single-throw switch being controllable by said processor.

12. The process of claim 11, in which said plurality of capacitors are substantially equal to each other.

13. The process of claim 11, in which said plurality of capacitors have capacitances proportional to sequential powers of 2.

14. The process of claim 10, in which said at least one of said parallel components includes a plurality of parallel legs, each leg including:
a single-pole double-throw switch, said single-pole double-throw switches having a first branch and a second branch, said single-pole double-throw switch being controllable by said processor;
a first capacitor in series with said first branch; and
a second capacitor in series with said second branch.

15. The process of claim 14, in which:
instances of said first capacitor are substantially equal to each other;
instances of said second capacitor are substantially equal to each other; and
a capacitance of said first capacitor in an instance of said parallel legs is at least twice as large as a capacitance f said second capacitor in said instance of said parallel legs.

16. The process of claim 1, in which said step of estimating an admittance of said RF component is performed by estimating said admittance of said RF component to be a value within a region of said complex admittance plane bounded by said three antenna admittance circles.

17. The process of claim 1, in which said step of said processor adjusting said admittance values of said at least one tunable component of said ladder network to desired values includes the steps of:
computing a first possible RF component admittance value at a first intersection of a first said antenna admittance circle from a first of said three VSWR measurements and a second said antenna admittance circle from a second of said three VSWR measurements;
computing a second possible RF component admittance value at said first intersection of said first antenna admittance circle and said second antenna admittance circle;
iterating through a plurality of settings for said at least one tunable component, so that each iteration includes the steps of:
iterating through said successive reference planes defined in said ladder network, starting with said reference plane immediately upstream of said RF component, so that each iteration includes the steps of:
computing an admittance at an instant reference plane assuming said admittance of said RF component is said first possible RF component admittance value; and
computing an admittance at an instant reference plane assuming said admittance of said RF component is said second possible RF component admittance value;
computing a first center of a possible antenna admittance circle for an estimated VSWR value assuming said admittance of said RF component is said first possible RF component admittance value;
computing a second center of a possible antenna admittance circle for an estimated VSWR value assuming said admittance of said RF component is said second possible RF component admittance value; and
computing a value for a figure of merit using angles of a first triangle, said first triangle having vertices at said center of said first said antenna admittance circle, said center of said second said antenna admittance circle, and said first center of said possible antenna admittance circle, and angles of a second triangle, said second triangle having vertices at said center of said first said antenna admittance circle, said center of said second said antenna admittance circle, and said second center of said possible antenna admittance circle; and
selecting a setting of said at least one tunable component for a third of said three VSWR measurements from said plurality of said settings such that said setting has a desired value of said figure of merit.

18. The process of claim 1, further including the step of performing a fourth VSWR measurement, and performing said step of estimating an admittance of said RF component by using four nearest intersections of said four RF component admittance circles.

19. The process of claim 18, in which said step of estimating an admittance of said RF component is performed by estimating said admittance of said RF component to be a value within a region of said complex admittance plane bounded by said four RF component admittance circles.

20. The process of claim 18, in which:
said step of said processor adjusting said admittance values of said at least one tunable component of said ladder network to desired values includes the steps of:
computing a first possible RF component admittance value at a first intersection of a first said antenna admittance circle from a first of said three VSWR measurements and a second said antenna admittance circle from a second of said three VSWR measurements;
computing a second possible RF component admittance value at said first intersection of said first antenna admittance circle and said second antenna admittance circle;
iterating through a plurality of settings for said at least one tunable component, so that each iteration includes the steps of:
iterating through said successive reference planes defined in said ladder network, starting with said reference plane immediately upstream of said RF component, so that each iteration includes the steps of:
computing an admittance at an instant reference plane assuming said admittance of said RF component is said first possible RF component admittance value; and
computing an admittance at an instant reference plane assuming said admittance of said RF component is said second possible RF component admittance value;
computing a first center of a possible antenna admittance circle for an estimated VSWR value assuming said admittance of said RF component is said first possible RF component admittance value;
computing a second center of a possible antenna admittance circle for an estimated VSWR value assuming said admittance of said RF component is said second possible RF component admittance value;
computing a value for a first figure of merit using angles of a first triangle, said first triangle having vertices at said center of said first said antenna admittance circle, said center of said second said antenna admittance circle, and said first center of said possible antenna admittance circle; and
computing a value for a second figure of merit using angles of a second triangle, said second triangle having vertices at said center of said first said antenna admittance circle, said center of said second said antenna admittance circle, and said second center of said possible antenna admittance circle;

selecting a setting of said at least one tunable component for a third of said three VSWR measurements from said plurality of said settings such that said setting has a desired value of said first figure of merit; and selecting a setting of said at least one tunable component for said fourth VSWR measurement from said plurality of said settings such that said setting has a desired value of said second figure of merit.

\* \* \* \* \*